March 29, 1966  E. KLINGELE ET AL  3,242,727
AMMUNITION TESTING APPARATUS
Filed Nov. 15, 1962  7 Sheets-Sheet 2

March 29, 1966   E. KLINGELE ET AL   3,242,727
AMMUNITION TESTING APPARATUS
Filed Nov. 15, 1962   7 Sheets-Sheet 3

March 29, 1966 E. KLINGELE ET AL 3,242,727
AMMUNITION TESTING APPARATUS
Filed Nov. 15, 1962 7 Sheets-Sheet 5
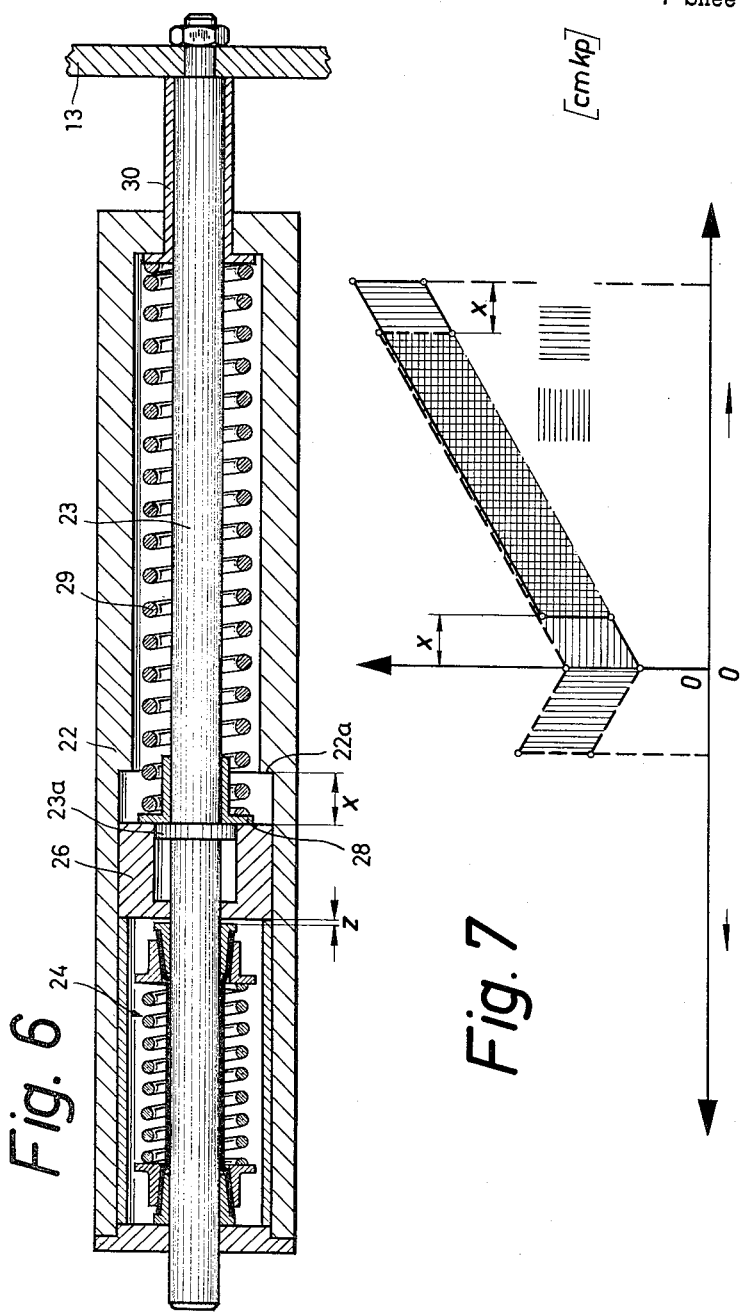

United States Patent Office 3,242,727
Patented Mar. 29, 1966

3,242,727
AMMUNITION TESTING APPARATUS
Ernst Klingele, Vohringen, Wurttemberg, Werner Junger-
mann, Karlsruhe, Baden, Rudolf Niemann, Mullheim,
Baden, and Ludwig Vorgrimler, Oberndorf (Neckar),
Germany, assignors to Messrs. Mauser-Werke Aktien-
gesellschaft, Oberndorf (Neckar), Germany
Filed Nov. 15, 1962, Ser. No. 237,842
Claims priority, application Germany, Nov. 29, 1961,
M 51,024
2 Claims. (Cl. 73—167)

The invention relates to an apparatus for testing ammunition. Hitherto ammunition was tested as to its suitability for use by ascertaining the maximum gas pressure of the propellant produced when firing by using a known gas pressure meter which was mounted on a measuring bore in the wall of the barrel of a weapon. The maximum gas pressure for each shot was thus determined. This, however, is not sufficient for judging the ammunition; for this purpose the plotted hits must also be used.

Hitherto it was customary to obtain each of these two data in a separate series of tests.

With the testing apparatus according to the invention it is now possible to make the two observations simultaneously. In this way ammunition is saved and the testing procedure is accelerated.

It is a known fact that the conventional fitting of the known gas pressure meter on the barrel of the weapon influences the precision of the barrel when firing in that the impulse of the propellant gas rushing into the gas pressure meter causes vibrations in the barrel and also in its bearings which, in turn, influence the individual trajectories and, thus, detrimentally affect the plotted hits. The other parts fitted on the barrel, such as recoil guides and brakes, the breech mechanism, including the lock case, contribute to the vibrations of the barrel. These vibrations are due, primarily, to the transverse forces occurring during firing.

The new testing apparatus according to the invention is, therefore, so designed that the occurrence of such transverse forces is prevented.

According to the invention all attachments which are movable with the barrel of the weapon, especially the gas measuring apparatus, are fitted in such a manner that the common centre of gravity is located in the axis of the bore of the barrel so that no transverse forces act on the barrel during firing.

To reduce, still further the vibrations which occur, the recoil braking device is also so constructed that its braking effect commences to act only after the projectile has left the barrel.

An embodiment of the new ammunition testing apparatus is illustrated by way of example in the accompanying drawings, in which.

Figure 3:
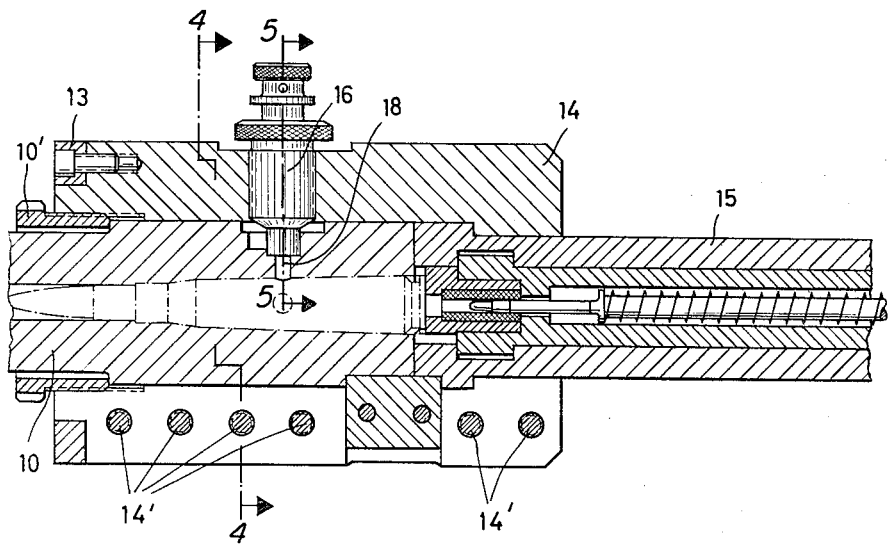
FIG. 3 is a longitudinal section through the barrel and the gas pressure measuring housing, as well as partly through the breech mechanism.
Figure 4:
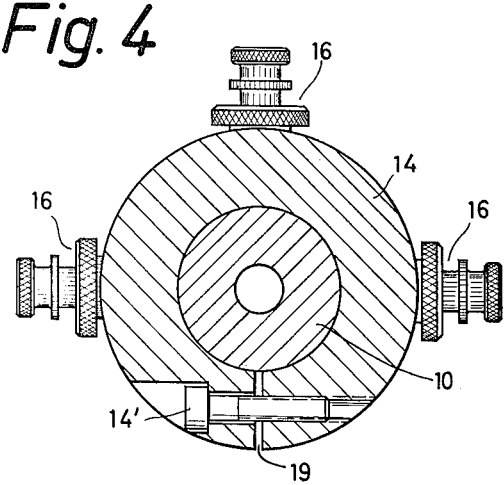
Figure 5:
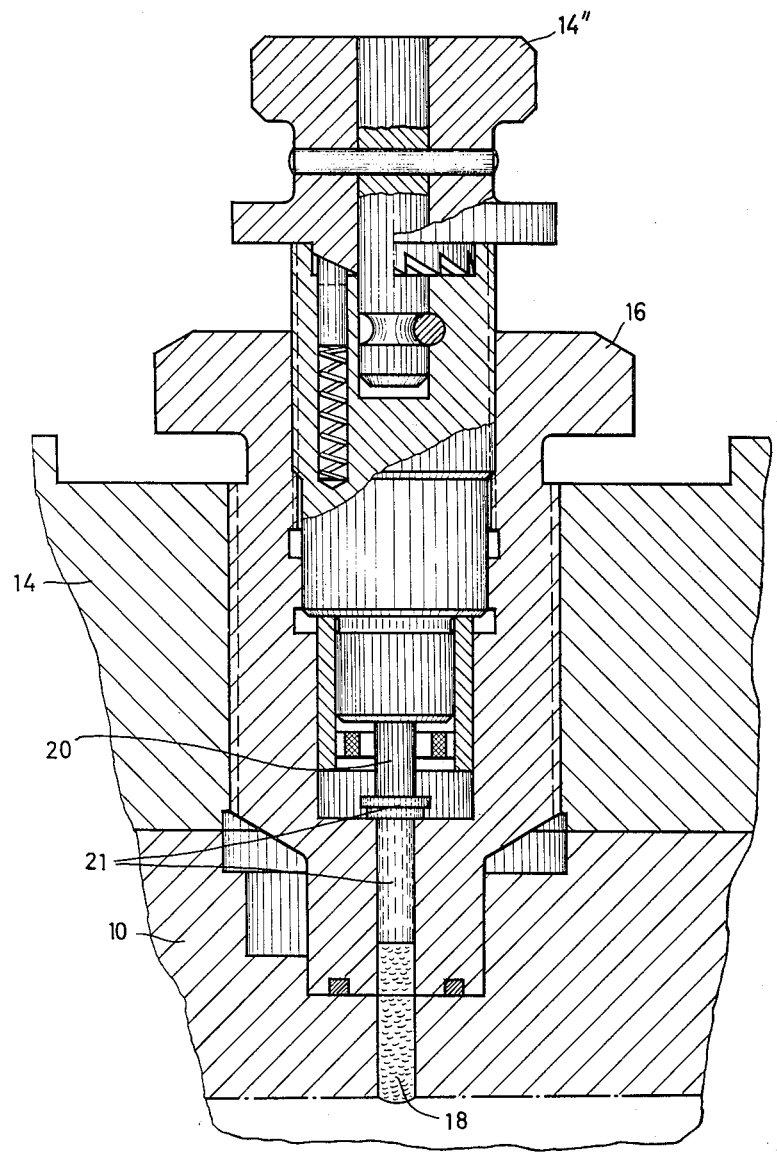
Figure 8:
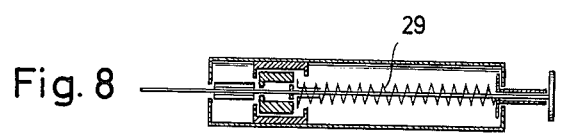
Figure 13:
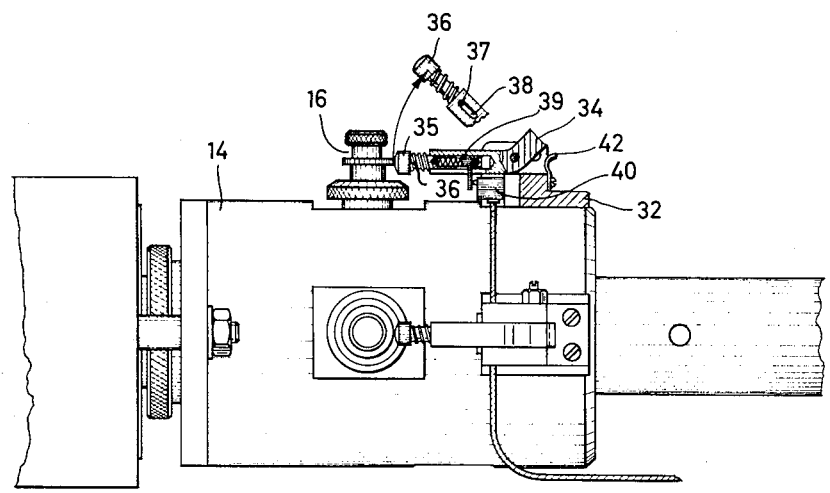
Figure 14:
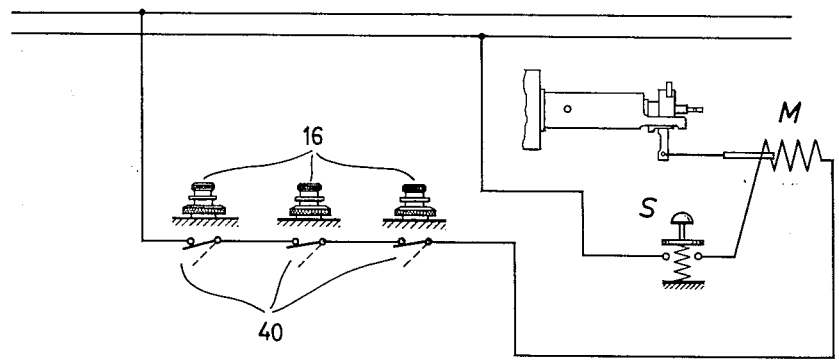

FIG. 4 a cross-section taken in the plane 4—4 of FIG. 3;

FIG. 5 a longitudinal section on a larger scale, taken on the line 5—5 of FIG. 3, through the housing accommodating the upsetting body;

FIG. 6 a longitudinal section through one of the recoil brakes;

FIG. 7 a diagram of the spring course and braking force of a recoil brake;

FIGS. 8 to 12 are diagrams showing the operation of the recoil brake;

FIG. 13 is a side elevation of the electrically controlled safety devices of the apparatus, one device being shown in section, and FIG. 14 shows the circuit arrangement thereof.

Figure 1:
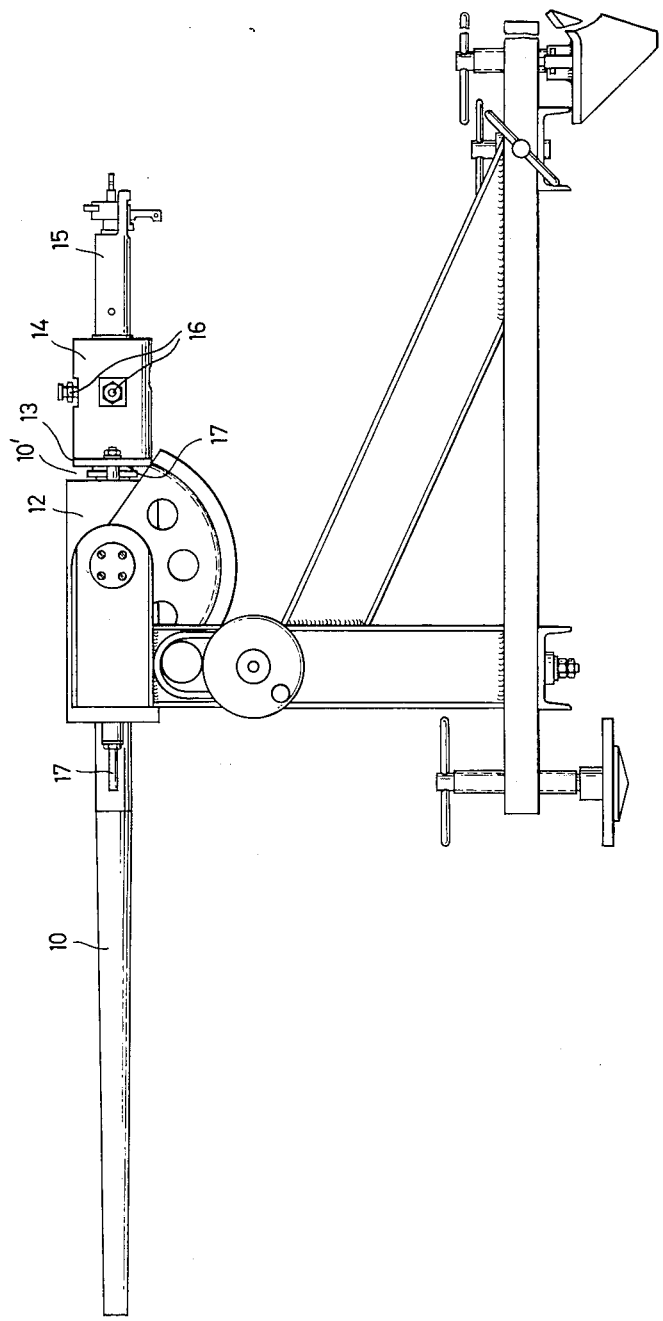
FIG. 1 shows the apparatus in side elevation.
Figure 2:
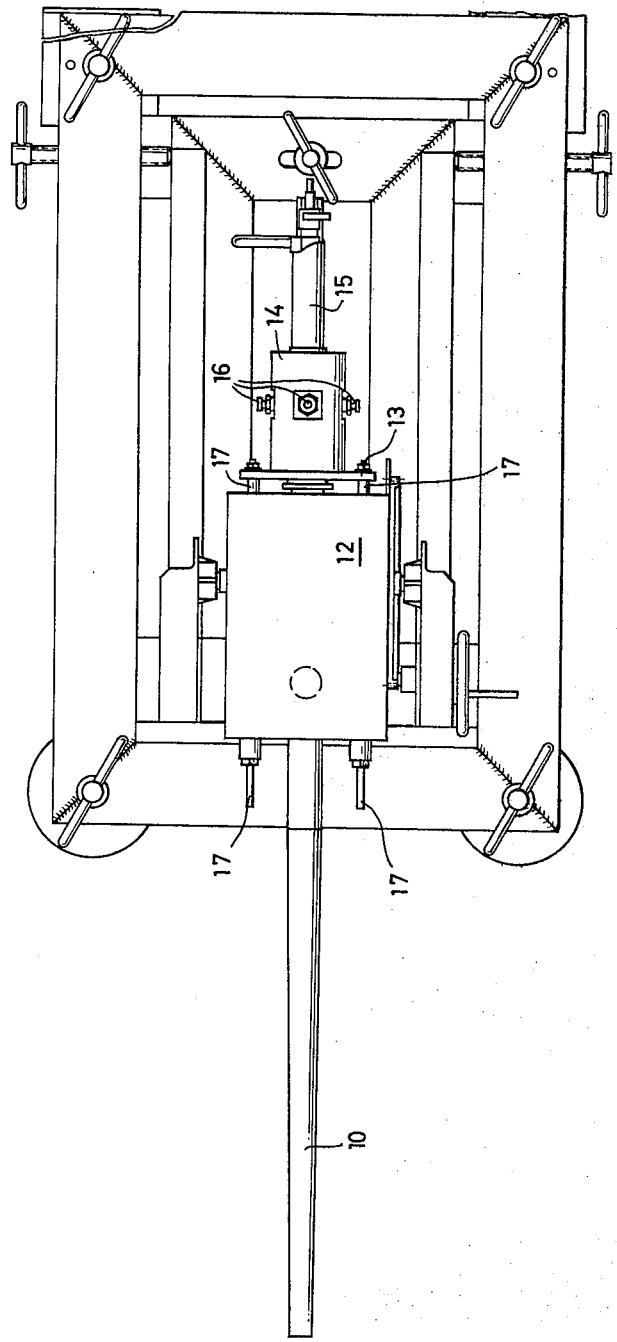
FIG. 2 is a plan view thereof.

The testing apparatus according to FIG. 1 is a heavy weapon mounted on a firing platform. It has a barrel 10 which is located in a box cradle 12 and carries at its rear end a breech box 15. In front of breech box 15, on the barrel 10, a gas pressure measuring housing 14 is mounted and the gas pressure measuring points are located here. Two recoil spindles 17 arranged one on each side of the barrel 10 are connected at their rear ends to a plate 13 which, in turn, is rigidly fixed on the front of the gas pressure measuring housing 14.

The common centre of gravity of the box cradle 12, the breech box 15, the gas pressure measuring housing 14, and the recoil spindle braking devices is located, according to the invention, in the axis of the bore of the barrel 10 so that no transverse forces can act on the barrel when firing.

The gas pressure measuring housing 14 is slit in longitudinal direction as indicated by the slit 19 (FIG. 4) and clamped on the barrel 10 by bolts 14' extending transversely through the slit 19. The measuring housing 14 is fixed on the barrel 10 (FIG. 3) by a nut 10'. Several screws 16 of the housing accommodating the upsetting body are mounted on the wall of the measuring housing 14 and distributed uniformly around the circumference thereof, each screw being located over a measuring bore 18 in the wall of the barrel 10. As is understood by those skilled in the art, an "upsetting body" is the testing cylinder or testing element of a crusher gauge, such as part 30 of U.S. Patent No. 2,870,631. The screws 16 are of known construction with the exception of the cover screw 14". This cover screw 14" is constructed as a torque limiting screw so that the contact pressure of the upsetting bodies 20, 21 on the measuring bore always remain the same and the upsetting cannot be falsified by the pressure gases.

In FIG. 5, there is illustrated a large scale longitudinal section taken through a housing accommodating the upsetting body. As indicated, gas pressure from the bore of the barrel 10 is admitted through the bore 18 to apply pressure to the measuring elements which are a copper bolt and a piezo-electric element, such as quartz or the like. These elements are represented in FIG. 5 by reference numeral 20. Both of these pressure measuring elements have long been known to those skilled in ordinance testing and are illustrated, for example, on pages 176 and 177 of the well-known "Handbook for Artillery Men, the 4th edition, printed by A. Bagel in Duesseldorf and published by Rheinmetall Borsig A. G. in September 1940 in German."

The recoil brake for the barrel of the testing apparatus is to act in such a manner that its braking effect commences only after the projectile has left the barrel.

Two braking spindles 23 are secured on the plate 13 in front of the gas pressure measuring housing 14 symmetrically to the weapon barrel 10. As the two recoil brakes are of similar construction, only one is described with reference to FIG. 6.

The brake spindle 23 carries a fixed collar 23a in front of which a uniform pressure brake 24 and behind which a compensating brake are arranged. The latter brake comprises a spiral spring 29 which is fitted under slight stress and bears at its front end against a sleeve 28 in contact with the collar 23a. The rear end of this spring 29 is supported at the rear end wall of the brake housing 22 by means of a spindle guide sleeve 30.

Brake 24 is designed as an equal pressure brake of the type invented by Dr. Helmut Gelling and described, for example, in German Patent No. 896,468. By reference to this German patent, it will be noted that an essential feature of such a brake is the braided friction sleeve 1–6 which embraces a spindle 5 and is arranged to be reduced in lateral dimension, to grip the spindle, by longitudinal stretching of the sleeve.

A characteristic of such a brake is that the brake force of the brake spring and the prevailing friction coefficient compensate each other so that the force required for moving the brake along the fixed part is always constant and equal to the brake spring force. In the present embodiment, which is identical in principle with the brake shown in the mentioned German patent, the brake lining is clamped between pairs of cones at opposite ends thereof, and the prestressed brake spring extends between these pairs of cones. An idle movement, or clearance or play for relative idling movement, is provided between the brake spindle 23 and an abutment sleeve 26 slidable to a limited extent in the brake housing 22 as is designated by $x$, and also between the rear pair of brake cones of the uniform pressure brake 24 and the abutment sleeve 26 as is designated by $z$.

The operation of one such brake spindle 23 is illustrated diagrammatically in FIGS. 8 to 12 and is as follows:

When the brake is inoperative (FIG. 8), that is when the barrel of the weapon is in its forward or advanced position, the compensating spring 29, being provided with slight pre-compression, holds the slidable abutment sleeve 26 in its forward position bearing against an abutment in the brake housing 22. If the weapon is set at an angle of elevation then the weight of the barrel is compensated by the compensating spring 29.

Figure 9:
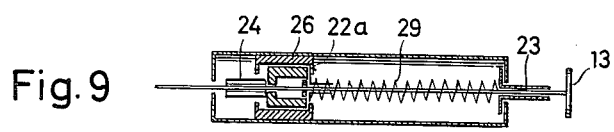

When a shot is fired, the recoil acts on the brake spindle 23. It moves backwards and carries along the uniform pressure brake 24 until, after covering a certain distance, the rear pair of brake cones strikes against the abutment sleeve 26, and pushes it back until it reaches the rear shoulder 22a of the brake housing 22. Through the intermediary of its collar 23a, the brake spindle 23 compresses the already slightly pre-stressed compensating spring 29 whose strength is not sufficient, however, to take up the recoil entirely. During this phase of the recoil condition the projectile has run through the barrel and reached the muzzle thereof. FIG. 9 shows the abutment sleeve 26 after traveling the major portion of path "$z+x$." The projectile has now reached the muzzle of the barrel.

Figure 10:
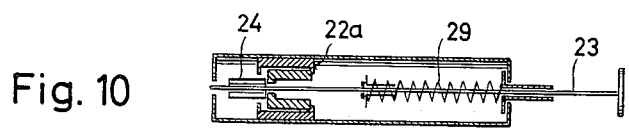
Figure 11:
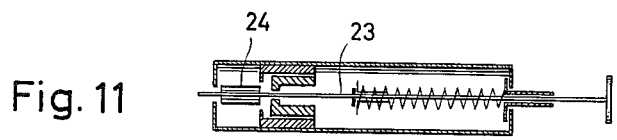
Figure 12:
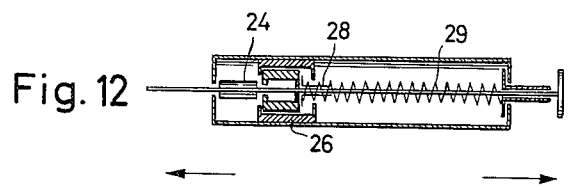

In the phase of the movement shown in FIG. 10, abutment sleeve 26 has engaged shoulder 22a and the full braking power of pressure brake 24 now becomes effective and remains at a constant value during the complete further recoil of the system. FIG. 11 shows the re-advancing of the system. First, brake spindle 23 glides forwardly with collar 23a disengaging sleeve 28. In this movement, brake spindle 23 carries with it the equal pressure brake 24, which is braked on the spindle, and for the length of the path "$x+z$" until the front pair of cones of equal pressure brake 24 bears against the outer closure of housing 22. During this movement, compensation spring 29 is released, with a certain delay, with this spring pushing parts 28 and 26 to the left or outwardly. During this movement, the full brake power is again exerted on spindle 23 by equal pressure brake 24.

When testing ammunition with the new apparatus, it might happen that one of the several measuring points is, through oversight, not fitted with a compressing or upsetting device. The gas pressure would then punch a piece out of the cartridge case being tested and possible blow out through the measuring bore. This might result in accidents.

The new apparatus is therefore provided with a safety device which locks the trigger of the weapon if compressing or upsetting devices are not fitted on all the measuring bores in the prescribed manner.

Such a safety device, which is provided with an electric lever system, is illustrated by way of example in FIGS. 13 and 14.

In FIGS. 13 and 14 the gas pressure measuring housing 14 can be seen. In the wall of the housing 14 the upsetting devices 16 are screwed. Behind each upsetting device 16 a pair of brackets 32 is fixed with screws on the housing wall, between which brackets 32 a finger 34, bent up at its rear end, is pivotally mounted on a pin.

Fitted in front of the finger 34 is a resilient feeler pin 35 the stroke of which is limited by a transverse pin 37 slidable in a longitudinal slot 38 in the wall of the finger 34. Behind the finger 34 an upright snap blade spring 42 is arranged which, when the finger 34 swings up with its feeler pin 35, locks the finger 34 and pins 35 in their raised position.

When the finger 34 is swung down the feeler pin 35 comes into contact with a flange on the cover screw of the screw 16 of the upsetting bolt housing and is pressed back thereby.

A small spring-loaded piston carrying a transverse contact pin 39 is slidable in the feeler pin 35. When the feeler pin 35 is pressed back this contact pin 39 closes a micro-switch 40 which is series connected in the circuit of the electrically actuated trigger, as indicated in FIG. 14.

The weapon can, however, be fired only when this series circuit is closed and this can take place only when the screw of the upsetting screw housing has pressed back the feeler pin 35, which again is possible only when all measuring bores are fitted in the prescribed manner.

FIG. 14 shows the micro-switches 40 of all measuring points connected in series. The weapon trigger is here operated in known manner by an electromagnet M when the push button S is depressed.

It can easily be seen that if any one micro-switch 40 is not closed because an upsetting bolt receiving housing is not properly depressed, the trigger cannot be operated.

It is evident that a mechanical lever system can be provided instead of the electric lever system of the safety device.

What is claimed is:

1. Ammunition testing apparatus comprising a recoiling weapon including a barrel having a bore through which ammunition is fired, and a gas pressure measuring device adapted to measure gas pressure in the barrel's bore; said measuring device being movable with said barrel and having its center of gravity located in the longitudinal central axis of the bore of the barrel so that no transverse forces can act on the barrel during the firing of the ammunition; and friction brake means exerting a constant frictional braking force on the barrel during recoil of the latter and moved with the latter during such recoil, said friction braking means being engageable with a portion of the mount for the gun and having initially a clearance, with respect to such mount portion, of an amplitude such that the full braking force is exerted on the barrel of the gun only after the projectile has left the barrel.

2. Ammunition testing apparatus as claimed in claim 1, in which said friction brake means comprises a relatively elongated spindle secured to move with the barrel; a double-acting uniform pressure brake operatively associated with said spindle; and a slightly pre-stressed compensating brake spring embracing and operative on said spindle; said compensating spring being compressed during recoil of the barrel and restoring the barrel to its initial position after the recoil with said pressure brake exerting a uniform braking force on the spindle during such restoration.

References Cited by the Examiner

UNITED STATES PATENTS

| | | | |
|---|---|---|---|
| 1,922,320 | 8/1933 | Olin et al. | 73—167 |
| 2,472,108 | 6/1949 | Hickman | 73—167 X |
| 2,504,958 | 4/1950 | Botts et al. | 89—44 X |
| 2,831,404 | 4/1958 | Sampson et al. | 89—44 X |
| 2,870,631 | 1/1959 | Musser et al. | 73—167 |
| 3,014,368 | 12/1961 | Musser et al. | 73—167 |
| 3,018,694 | 1/1962 | Browning | 89—162 X |

FOREIGN PATENTS

| | | |
|---|---|---|
| 137,379 | 11/1901 | Germany. |
| 404,622 | 1/1934 | Great Britain. |

DAVID SCHONBERG, *Primary Examiner.*

A. M. HORTON, RICHARD C. QUEISSER, *Examiners.*

L. L. HALLACHER, *Assistant Examiner.*